Patented Jan. 16, 1945

2,367,646

UNITED STATES PATENT OFFICE 2,367,646

PROCESS FOR RECOVERING CRYSTALLINE RIBOFLAVIN

Graham W. McMillan, Terre Haute, Ind., assignor to Commercial Solvents Corporation, Terre Haute, Ind., a corporation of Maryland No Drawing. Application May 28, 1943, Serial No. 488,904

19 Claims. (Cl. 260—211)

My invention relates to a process for recovering riboflavin from solutions containing the same. More particularly, it pertains to a process for the recovery thereof by means which involve chemical precipitation methods.

With the advent of the manufacture of riboflavin on a commercial scale, there arose a need for an efficient and economical method of recovering that material from the various types of media in which it was produced. This need was especially felt where riboflavin was produced by biochemical methods since, in general, such procedures involve the use of relatively large volumes of liquids, and result in the procurement of large volumes of solutions containing riboflavin in low concentrations. Because of this fact, former methods employed for separating riboflavin from its solutions, such as those based upon the precipitation of riboflavin in the form of a metal complex, etc., are entirely impractical for the reason that such methods presuppose the use of solutions having comparatively high concentrations of riboflavin. Also, methods involving evaporation of large volumes of the dilute riboflavin solutions are obviously out of the question since they are so time-consuming and entail such high operation costs.

In copending application, U. S. Serial No. 435,418, by George E. Hines, Jr., filed March 19, 1942, a process is described whereby dissolved riboflavin can be converted to a less soluble form and recovered from nutrient solutions as a precipitate containing between about 60 and 90 per cent riboflavin, by inoculating said solutions with an active culture of bacteria capable of producing a potential therein favorable to the procurement of conditions that cause the dissolved riboflavin to precipitate. While highly satisfactory results can be secured by utilizing the above-mentioned process, it is not entirely free from certain material disadvantages. First of all, as indicated above, the application of the aforesaid process is limited to the recovery of riboflavin from nutrient solutions, i. e., solutions capable of sustaining active growth of the bacteria utilized. A further disadvantage of this process is that it requires from about 2 to 24 hours for substantially complete precipitation and an additional 18 to 36 hours for sedimentation of the reduced riboflavin, depending principally upon the depth and viscosity of the nutrient solution and the temperature at which such operation is effected. A still further disadvantage of the aforesaid procedure is the fact that it must be carried out under substantially aseptic conditions to obtain consistently good results which perforce require additional operation expense.

In copending application U. S. Serial No. 488,903, filed May 28, 1943, a process is described by which riboflavin can also be recovered in crystalline form from its solutions. In the procedure there described, a reducing agent consisting of a soluble salt such as titanium trichloride, stannous chloride, sodium dithionite, etc., is added to the solution containing dissolved riboflavin, thereby effecting reduction of the riboflavin to a less soluble form, which in turn results in the precipitation thereof. This process, although it constitutes an improvement over methods involving the bacterial precipitation of riboflavin, since it is not restricted to the use of riboflavin-containing solutions capable of sustaining bacterial growth, possesses the disadvantage of requiring a period of from 18 to 24 hours for substantially complete precipitation, sedimentation, and satisfactory recovery of the riboflavin crystals from the original solution.

I have now discovered that dissolved riboflavin can be effectively and economically recovered from solutions containing the same by means of a process that is free from the above-mentioned disadvantages. Briefly, my invention involves recovery of riboflavin from solutions of the aforesaid type by adding thereto a soluble reducing agent having an $E^\circ$ that is less negative than about $-0.15$ volt, together with a finely-divided diatomaceous earth, preferably of the nonadsorbent type, which functions in my process to greatly reduce the time required for the separation of riboflavin from its solutions, once precipitation of the vitamin has been initiated. The precipitate thus obtained is composed largely of non-adsorbent diatomaceous earth, i. e., from about 60 to 90 per cent, while the remainder consists principally of riboflavin in a reduced and less soluble form. Since the later is not identical in its characteristics with the vitamin as it is commonly known, but may on treatment with a suitable solvent be converted to the normal form as described below, the less soluble form of riboflavin present in the precipitate, in order to avoid any ambiguity, will be hereinafter referred to as a "riboflavin precursor."

While it will be obvious to those skilled in the art that my invention is generally applicable to the recovery of riboflavin from solutions of that vitamin, I have found it especially useful in the recovery of riboflavin from aqueous solutions of the type encountered in the production thereof by microorganisms, particularly from those solutions of the type produced in accordance with the procedure of copending application Serial No. 434,901, filed March 16, 1942, by Hugh R. Stiles. According to this process, greatly increased yields of riboflavin can be obtained by fermenting protein-carbohydrate-containing mashes with the fungus *Eremothecium ashbyii*, while maintaining the mash in a high state of aeration throughout the fermentation. By utilizing the combination of the aforesaid soluble reducing agent and finely-divided diatomaceous earth, I am able to substantially completely transform riboflavin within a period of from about fifteen to twenty minutes, into its less soluble precursor, which is easily and immediately separable from the aqueous phase, regardless of the volume of solution involved. One of the outstanding advantages of my process, therefore, is the fact that the overall time required to precipitate riboflavin from its solutions, isolate the resulting riboflavin precursor, and convert the latter into substantially pure crystalline riboflavin, is greatly reduced. The procedure described below is one which is particularly adapted to the recovery of riboflavin from solutions of the type obtained in accordance with copending Serial No. 434,901, referred to above. However, with certain obvious modifications, it will be apparent to those skilled in the art that such process can be generally applied for the recovery of riboflavin from substantially any solution containing no excessive amounts of foreign materials that are more readily reduced than riboflavin, under the conditions set forth.

In accordance with a preferred embodiment of my invention, the solution of riboflavin which contains a relatively high proportion of dead mold cells, as well as fibrous materials, is first heated to a temperature of from about 70° to 90° C., preferably about 80° C., in order to facilitate subsequent filtration, after which the mass is filtered. This filtrate may then be cooled to a temperature of between about 4° and 45° C., preferably between 20° and 30° C., and the pH adjusted to a value of between approximately 2 and 7.5, and preferably between 5.0 and 5.5, by the addition of a material such as sulfuric acid or sodium carbonate, whichever the particular solution may require in order to bring it within the aforesaid pH range. A sample is then withdrawn from the solution to determine the riboflavin concentration thereof, which in turn determines the quantity of the reducing agent to be added. Subsequent to the addition of the reducing agent, the solution containing dissolved riboflavin is preferably maintained in a substantially air-free state. This object may readily be accomplished by passing carbon dioxide or other suitable inert gas through the solution at a rate of between about 7 and 9 cubic feet per hour per square foot of solution surface, thereby substantially displacing the dissolved air, and also preventing contact of the solution surface with air. This precaution serves to prevent the riboflavin precursor from being reconverted into the more soluble form of riboflavin, by the action of air at the interface. In this connection it should be mentioned that a gas such as carbon dioxide need not necessarily be employed when working with small volumes of solution, since the overall time with which said solution is in contact with the atmosphere is relatively short, and, as a result, comparatively little of the precursor is affected. Precipitation of the riboflavin precursor will generally be observed to occur immediately subsequent to the addition of the reducing agent, after which the finely-divided diatomaceous material is introduced. As previously mentioned, substantially complete precipitation occurs within approximately fifteen to twenty minutes; in order to be certain that complete precipitation is obtained, however, the resulting mixture is preferably allowed to stand for a period of about 30 minutes. Throughout the precipitation and subsequent filtration step, the measured potential of the solution is periodically determined to insure the maintenance of conditions most favorable to the existence of the riboflavin precursor. I have observed that precipitation does not occur until a definite measured potential has been established. However, in general, it may be said that such potential must lie within the approximate range of −0.300 and −0.650 volt. Potentials substantially more negative than the latter figure tend to cause decomposition of the aforesaid precursor, and hence, should be avoided, while potentials less negative than about −0.300 volt result in solution of the precipitate. If solution of the precursor does not occur under such conditions, the latter may be readily reprecipitated by the addition of more reducing agent.

The above values were determined at 22° C. by measuring the potential of a cell consisting of a gold plated platinum electrode and a saturated calomel electrode, both of which were in contact with the riboflavin-containing solution. The rapidity with which the above stated potential range is reached will usually depend on the strength and quantity of the particular reducing agent employed. Ordinarily, the desired potential is obtained within a few minutes after addition of the reducing agent.

After the solution has been permitted to stand for the above-mentioned period, it is run through a suitable filtering means. The filtrate thus obtained will generally be found to assay from about 10 to 20 per cent of the riboflavin present in the solution prior to the precipitation treatment. The residue, which consists chiefly of the finely-divided diatomaceous matter and riboflavin precursor, is brought to a state of substantial dryness by subjecting the same to a blowing operation with compressed air or other suitable gas. The resultant dried cake is next removed from the filtering means, and the riboflavin precursor removed therefrom in any convenient manner. I prefer to accomplish this object, however, by following the general procedure outlined in copending application U. S. Serial No. 435,481, filed March 23, 1942 by J. K. Dale. According to the process there described, the dried cake is extracted with a suitable solvent for said precursor for a period of about five to ten minutes, or longer, in the presence of agitation and at a temperature of between 60 and 90° C. After this extraction period, the resultant slurry is conducted to a suitable filtering means, where the diatomaceous material is separated as a residue. The filtrate obtained in this manner, and which contains substantially pure riboflavin in a dissolved state, is then rapidly chilled to a temperature of about 15° to 25° C., while air is simultaneously introduced into the solution during and after the chilling operation. As a result of this operation, riboflavin is obtained in the form of bright yellow crystals which may readily be separated from the mother liquor by filtration, or other convenient means. Air introduced at the above-mentioned stage of my process, causes oxidation of the riboflavin back to its commonly-known form, and, incidentally, the form in which it was first present in the originally-treated solution.

It will thus be seen that the above-described procedure is, in effect, a method for concentrating the riboflavin in the form in which it originally existed in the first solution. Precipitation of the dissolved riboflavin in the form in which it is present in the latter solution, does not occur owing to its extreme state of dilution. But by converting the aforesaid form, through reduction, into the aforesaid precursor, it precipitates and this precipitate is ultimately extracted with a suitable hot solvent whose volume is much less than that of the original solution. By introducting air into such solution at this point, the precursor, or reduced form of riboflavin, is then converted to the oxidized structure, which is now present in much higher concentrations than in the original solution, thus causing the solubility product of the oxidized form of riboflavin to be exceeded as the temperature of the solution is decreased, which, of course, results in the precipitation of the latter form.

In order to obtain consistently good results, it is generally desirable to employ the extraction solvents, as mentioned above, in an amount corresponding to not in substantial excess of $\frac{1}{20}$ of the volume of the original solution. Within the aforesaid limits, however, it will be apparent that the quantity of solvents utilized in any given instance will, in part at least, be dictated by the percentage of riboflavin precursor in the residue obtained by filtration. Numerous materials will serve satisfactorily as extractants in my process. Examples of such substances are water, aqueous solutions of the lower aliphatic alcohols, propylene glycol, carbitol, methyl carbitol, dilute acids and bases, and the like.

The materials that may be used as reducing agents in the process of my invention, are any of those substances soluble in the riboflavin solution, and which have an $E°$ that is less negative than about $-0.15$ volt, when said substances are at unit activity at 25° C. Such materials are capable of producing a measured potential in solutions of the type contemplated, of between about $-0.300$ and $-0.650$ volt, corresponding to an $E_h$ value within the approximate range of $-0.050$ and $-0.400$ volt. In this connection the symbol "$E_h$" represents the potential resulting from the potential difference across the interface existing between the gold-plated platinum electrode and the cell solution, which in the present invention is a riboflavin-containing solution. This particular potential, designated by the symbol "$E_h$", may be further defined by showing its relationship to the measured potential of the cell chain as demonstrated in the equation $$E_h = E_c + E_r$$

where $E_c$ represents the cell chain potential and $E_r$ is the potential of the reference electrode, which in the present case is a saturated calomel half-cell. The value for $E_r$ at 22° C., the temperature at which the potentials were measured, is $+0.250$ volt.

Specific examples of reducing agents capable of producing a potential within the desired range are compounds that furnish the following ions: $Sn^{++}$, $Ti^{+++}$, $S_2O_4^=$, $Cr^{++}$ and $V^{++}$. Specific examples of compounds capable of furnishing such ions are titanium trichloride, stannous chloride, sodium dithionite ($Na_2S_2O_4 \cdot 2H_2O$), hypovanadous sulfate, hypovanadous chloride, chromous chloride, chromous sulfate, and the like.

The quantity of reducing agent employed in carrying out my invention, varies within a relatively wide range, and will be found to depend upon several factors, one of which is the measured potential of the solution. For example, if the potential is comparatively high, there will obviously be required a higher proportion of reducing agent to bring the $E_h$ down to a value that lies within the critical range of $-0.050$ and $-0.400$ volt. However, when the initial potential of the solution is relatively low, of course, a smaller amount of reducing compound will be needed to obtain an $E_h$ that falls within the aforesaid range. Generally it will be observed that the quantity of reducing agent employed may vary from about two to five moles per mole of riboflavin present in the solution. Ordinarily, no benefit will be derived from using an excess of reducing agent greater than the mole ratio of five to one. In fact, a concentration of reducing agent which is in excess of the aforesaid ratio may actually prove harmful, since the conditions resulting from higher concentrations thereof may promote decomposition of the riboflavin precursor. Also, in this connection, it may be said that solutions containing dissolved riboflavin in concentrations below about 20 $\mu$g. per ml., are, for all practical purposes, inoperative in my process. It will, of course, be obvious that riboflavin may be recovered, in accordance with my invention, from solutions containing less than 20 $\mu$g. per ml., provided prior to the use of my process the riboflavin content of said solution is increased to the aforesaid value by evaporation or any other convenient means.

While optimum results are in general obtained at temperatures of between about 22° and 25° C., and within a pH range of about 5.0 to 5.5, as previously indicated precipitation will occur at temperatures ranging from about 4° to 45° C., and at pH values of from about 2.0 to 7.5. In this connection, I have observed that at the lower pH values a less negative $E_h$ is required to effect precipitation at a given temperature, but at any fixed pH the $E_h$ necessary for precipitation will be found to become more negative with increasing temperature. Furthermore, at any given temperature the $E_h$ required to effect precipitation becomes more negative with increasing pH of the solution. Otherwise stated, the $E_h$ necessary to bring about precipitation of the riboflavin precursor varies inversely with the pH and temperature of the solution utilized.

The material which I utilize in shortening the period normally required to isolate riboflavin from its solutions, may be any of a number of different siliceous substances, which are either substantially incapable of adsorbing riboflavin, or adsorb it only to a slight degree and have an average particle size of from about 1 to 45 micrograms. Super-Cel, Filter-Cel, kieselguhr, etc., are examples of such materials. The two former substances consist essentially of finely-divided diatomaceous earth having an average particle size of from 1 to 12 $\mu$ and from 2 to 16 $\mu$, respectively. The quantity of this siliceous substance utilized may vary, but in the main will be found to be determined by the volume of solution involved, and not the concentration of riboflavin. For the majority of instances, however, I have found that optimum results are obtained by using the aforesaid material in a concentration of about 1 pound for each 80 gallons of solution.

In the examples which follow the yield is the value obtained by dividing the weight of riboflavin initially present into the sum of that isolated in the form of crystals and the quantity of riboflavin remaining in the mother liquor of crystallization. The conversion figures were calculated by dividing the weight of crystals isolated by the riboflavin initially present.

*Example I*

Thirty four and three-tenths liters of a solution containing riboflavin in a concentration of 281 μg. per ml., was adjusted to a pH of 5.3, by the addition of the necessary amount of concentrated sulfuric acid. Carbon dioxide was next introduced into the solution through a jet located near the bottom of the container, at a rate of 8 cubic feet per hour per square foot of solution surface. Twenty-seven grams of sodium dithionite was then added, with agitation, to the solution, and precipitation of the riboflavin precursor was observed to commence almost immediately, after which 64 grams of Super-Cel was added thereto, and the resulting mixture allowed to stand. Thirty minutes after the addition of sodium dithionite, the mixture was filtered through a Buchner funnel, and the filtrate, thus obtained, found to assay 25 μg. of riboflavin per ml. The $E_h$ during these operations was maintained between —0.285 and —0.295 volt. Up to this point, i. e., from the time the sodium dithionite was added until the mass was filtered, the elapsed time was 80 minutes. The resultant residue was extracted with 1.8 liters of 75 per cent isopropyl alcohol at a temperature of 80° C. The Super-Cel was separated from the solution by filtration, and the filtrate rapidly chilled to a temperature of about 23° C., during which time air was introduced at the bottom of the containing vessel. As a result of this treatment, bright yellow crystals of riboflavin were obtained as a precipitate. These crystals were then isolated from the mother liquor by filtration, and when dry amounted to 6.5 grams. The mother liquor, on assay, showed 2.25 grams of dissolved riboflavin to be present indicating a yield of 90.8 per cent and a conversion of 67.5 per cent.

*Example II*

Five thousand sixty-three gallons of a fermentation residue containing 330 μg. of riboflavin per ml., produced by the action of the organism *Eremothecium ashbyii* on a nutrient mash, was heated to a temperature of 80° C., after which 933 pounds of Filter-Cel was added and the mixture filtered through a 36-inch 12-plate Sperry filter-press. The filtrate, thus obtained, was then cooled to 25° C., and the pH adjusted to 5.2 by the addition of the required amount of sulfuric acid. Carbon dioxide was then continuously introduced into the solution through a jet at the bottom of the tank at a rate of approximately 8.5 cubic feet per hour per square foot of solution surface, after which was added thereto 33.2 pounds of sodium dithionite. Precipitation of the riboflavin precursor was observed at once and thereafter 63 pounds of Super-Cel was added to the solution. In order to insure uniform distribution of both carbon dioxide and Super-Cel, the solution was agitated throughout the precipitation step by means of a 3-blade propeller type mixer 14 inches in diameter and operating at 320 R. P. M. Approximately one-half hour after the sodium dithionite had been added, the mixture was filtered with the aid of a 24-inch filter-press of the aforesaid type. The $E_h$ during the precipitation and filtration steps was maintained between —0.288 and —0.295 volt. The total period of time required from the addition of the sodium dithionite to the completion of the above filtration step, was 3 hours. The filter cake obtained in this manner, and which consisted essentially of riboflavin precursor and Super-Cel, was extracted with 250 gallons of 75 per cent isopropyl alcohol at a temperature of 82° C., in accordance with the procedure set forth in Example I. A total of 9.45 pounds of yellow crystalline riboflavin was isolated, while the mother liquor was shown, on assay, to contain 2.17 pounds of dissolved vitamin, thus corresponding to a conversion of 68 per cent, and a yield of 83.7 per cent.

*Example III*

To 1000 ml. of a solution having a pH of 5.3 and containing riboflavin in a concentration of 268 μg. per ml., .57 gram of titanium trichloride was added under conditions substantially identical with those described in Example I, save for the fact that carbon dioxide was not used. After the titanium trichloride had been added, 2 grams of Super-Cel was stirred into the mixture, after which the latter was permitted to stand for 10 minutes. The mixture was next filtered through a Buchner funnel and the filtrate, on assay, showed riboflavin to be present in a concentration of .27 μg. per ml., indicating that 90 per cent of the riboflavin in the original solution had been removed. During these operations the $E_h$ of the solution varied between —0.280 and —0.285 volt. The total time required from the addition of titanium trichloride to the completion of the filtration step, was 20 minutes. The residue obtained by filtering the solution treated with Super-Cel and titanium trichloride, was extracted with 50 ml. of 75 per cent isopropyl alcohol at 83° C., in accordance with the method appearing in Example I. The riboflavin thus recovered, in the form of crystals, amounted to .174 gram, corresponding to a conversion of 65 per cent.

For the purpose of demonstrating the advantages of my process over those methods which use only a reducing agent in the precipitation step, the following example is included:

*Example IV*

To thirty four and five-tenths liters of a solution having a pH of 5.1 and containing riboflavin in a concentration of 310 μg. per ml., was added 25.5 grams of sodium dithionite. The resulting mixture contained fine particles of riboflavin precursor; however, the precipitate thus formed could not be conveniently separated by filtration, and, as a result, the mixture had to stand until substantially all of the precursor had settled to the bottom of the containing vessel. The spent top liquor was then decanted, Super-Cel added to the residue and the latter filtered through a Buchner funnel. The total time elapsed from the addition of the sodium dithionite to the completion of the filtration, was 22 hours. During this operation the $E_h$ remained substantially constant at —0.294 volt. The resulting residue was then extracted with 2 liters of 75 per cent isopropyl alcohol, and the dissolved riboflavin crystallized therefrom in accordance with the procedure of Example I. A total of 8 grams of riboflavin was thus obtained, while the mother liquor from the crystallization step was found to contain 1.67 grams, corresponding to a conversion of 74.5 per cent, and a yield of 90.5 per cent.

While the above description and examples emphasize the applicability of my invention to batch operation methods, it is to be specifically understood that by employing certain obvious modifications, it is equally well adapted to continuous procedure.

The process, as set forth above, may also be modified to the extent that the residue containing riboflavin need not be removed from the filtering means, but may be subjected to extraction with a suitable solvent while said residue remains in the filter. This operation is generally effected by circulating said solvent at the desired temperature through the residue until the riboflavin precursor has been substantially completely extracted therefrom. The extract containing the dissolved precursor may then be treated in the manner previously described to obtain the crystalline riboflavin. It will thus be seen that by employing this expedient, one of the filtration steps essential in carrying out the procedure first described, is eliminated.

Having now described my invention, what I claim is:

1. In a process for the recovery of riboflavin from solutions having a riboflavin concentration of at least 20 μg. per ml., the steps comprising adding to the solution a finely-divided nonadsorbent siliceous substance and a soluble reducing agent having an $E°$ which is less negative than about —0.15 volt, to produce an $E_h$ in said solution corresponding to a value of between about —0.050 and —0.400 volt.

2. In a process for the recovery of riboflavin from solutions having a riboflavin concentration of at least 20 μg. per ml., the steps which comprise maintaining the solution substantially free from air by the continuous presence of an inert gas, adding to the solution a finely-divided nonadsorbent siliceous substance and a soluble reducing agent having an $E°$ which is less negative than about —0.15 volt, to produce an $E_h$ in said solution corresponding to a value of between about —0.050 and —0.400 volt.

3. In a process for the recovery of riboflavin from solutions having a riboflavin concentration of at least 20 μg. per ml., the steps which comprise adjusting the initial pH of the solution to a value ranging from about 2.0 to 7.5, adding to the solution a finely-divided nonadsorbent siliceous substance having an average particle size of between 1 and 45 microns, and a soluble reducing agent having an $E°$ which is less negative than about —0.15 volt, to produce an $E_h$ in said solution corresponding to a value of between about —0.050 and —0.400 volt, and precipitating said riboflavin in the form of a precursor the $E_h$ required to effect said precipitation varying inversely with the increment of the pH.

4. In a process for the recovery of riboflavin from solutions having a riboflavin concentration of at least 20 μg. per ml., the steps which comprise adjusting the initial pH of the solution to a value ranging from about 2.0 to 7.5, adding to the solution at a temperature of about 4° to 45° C., a finely-divided nonadsorbent siliceous substance having an average particle size of from 1 to 45 microns and a soluble reducing agent having an $E°$ which is less negative than about —0.15 volt, producing an $E_h$ in said solution corresponding to a value of between about —0.050 and —0.400 volt, and precipitating said riboflavin in the form of a precursor, the $E_h$ required to effect the precipitation varying inversely with the increment of pH and temperature.

5. In a process for the recovery of riboflavin from solutions having a riboflavin concentration of at least 20 μg. per ml., the steps which comprise adjusting the initial pH of the solution to a value ranging from about 5.0 to 5.5, adding to the solution at a temperature of about 20° to 30° C., a finely-divided nonadsorbent siliceous substance having an average particle size of from 1 to 45 microns and a soluble reducing agent having an $E°$ which is less negative than about —0.15 volt, producing an $E_h$ in said solution corresponding to a value of between about —0.050 and —0.400 volt, and precipitating said riboflavin in the form of a precursor, the $E_h$ required to effect the precipitation varying inversely with the increment of pH and temperature.

6. In a process for the recovery of riboflavin from solutions having a riboflavin concentration of at least 20 μg. per ml., the steps which comprise adding to the solution a finely-divided diatomaceous earth having an average particle size of from 1 to 12 μ and a soluble reducing agent having an $E°$ which is less negative than about —0.15 volt, to produce an $E_h$ in said solution corresponding to a value of between about —0.050 and —0.400 volt.

7. In a process for the recovery of riboflavin from solutions having a riboflavin concentration of at least 20 μg. per ml., the steps which comprise adjusting the pH of the solution to a value between the range of about 2.0 to 7.5, introducing carbon dioxide into the solution at the rate of approximately 7 to 9 cubic feet per hour per square foot of solution surface, adding to the solution a finely-divided diatomaceous earth having an average particle size of from 1 to 12 μ and a soluble reducing agent having an $E°$ which is less negative than —0.15 volt, producing an $E_h$ in said solution corresponding to a value of between about —0.050 and —0.400 volt, and precipitating said riboflavin in the form of a precursor, the $E_h$ required to effect said precipitation varying inversely with the increment of the pH.

8. In a process for the recovery of riboflavin from solutions having a riboflavin concentration of at least 20 μg. per ml., the steps which comprise adjusting the initial pH of the solution to a value between the range of about 2.0 and 7.5, adding to the solution a finely-divided diatomaceous earth having an average particle size of from 1 to 12 μ and a soluble reducing agent capable of furnishing ions selected from the group consisting of $Sn^{++}$, $S_2O_4^{=}$, $V^{++}$, $Ti^{+++}$, and $Cr^{++}$.

9. In a process for the recovery of riboflavin from solutions fermented by the organism *Eremothecium ashbyii* and having a riboflavin concentration of at least 20 μg. per ml., the steps which comprise adjusting the initial pH of the solution to a value between about 2.0 and 7.5, adding to the solution a finely-divided nonadsorbent siliceous substance having an average particle size of from 1 to 45 microns, and a soluble reducing agent having an $E°$ which is less negative than about —0.15 volt, to produce an $E_h$ in said solution corresponding to a value between about —0.050 and —0.400 volt, and precipitating said riboflavin in the form of a precursor, the $E_h$ required to effect said precipitation varying inversely with the increment of the pH.

10. In a process for the recovery of riboflavin from solutions having a riboflavin concentration of at least 20 μg. per ml., the step which comprises adding to the solution sodium dithionite and a finely-divided diatomaceous earth having an average particle size of from 1 to 12 μ.

11. In a process for the recovery of riboflavin from solutions having a riboflavin concentration of at least 20 μg. per ml., the step which comprises adding to the solution titanium trichloride and a finely-divided diatomaceous earth having an average particle size of from 1 to 12 μ.

12. In a process for the recovery of riboflavin from solutions having a riboflavin concentration of at least 20 μg. per ml., the steps which comprise adjusting the initial pH of the solution to a value of between 2.0 and 7.5, adding to the solution a finely-divided diatomaceous earth having an average particle size of from 1 to 12 μ and a soluble reducing agent having an $E°$ which is less negative than $-0.15$ volt, producing an $E_h$ in said solution corresponding to a value of between about $-0.050$ and $-0.400$ volt, said reducing agent being employed in a ratio of between about 2 to 5 moles per mole of riboflavin present, and precipitating said riboflavin in the form of a precursor, the $E_h$ required to effect said precipitation varying inversely with the increment of the pH.

13. A method for obtaining highly concentrated solutions of riboflavin from dilute solutions thereof, which comprises adjusting the initial pH of the latter to a value of between about 2.0 and 7.5, precipitating the riboflavin in the form of a riboflavin precursor by adding to said dilute solution a finely-divided nonadsorbent siliceous substance having an average particle size from 1 to 45 microns and a soluble reducing agent having an $E°$ which is less negative than $-0.15$ volt, producing an $E_h$ in said solution corresponding to a value of between about $-0.050$ and $-0.400$ volt, the $E_h$ required to effect said precipitation varying inversely with the increment of the pH, and filtering the resultant mixture and extracting the residue thus obtained at a temperature of between about 60 and 90° C. with a solvent for said precursor.

14. A method for obtaining highly concentrated solutions of riboflavin from dilute solutions thereof, which comprises adjusting the initial pH of the latter to a value of between about 5.0 and 5.5, precipitating the riboflavin in the form of a riboflavin precursor by adding to said dilute solution at a temperature of between about 20° to 30° C., a finely-divided nonadsorbent siliceous substance having an average particle size of from 1 to 45 microns and a soluble reducing agent having an $E°$ which is less negative than $-0.15$ volt, producing an $E_h$ in said solution corresponding to a value of between about $-0.050$ and $-0.400$ volt, the $E_h$ required to effect said precipitation varying inversely with the increment of the pH and temperature, and filtering the resultant mixture and extracting the residue thus obtained at a temperature of between about 60° and 90° C. with a solvent for said precursor, the quantity of solvent utilized corresponding to approximately 1/20 of the volume of said dilute solution.

15. A method for obtaining highly concentrated solutions of riboflavin from dilute solutions thereof, which comprises precipitating the riboflavin in the form of a riboflavin precursor by adding to said solution sodium dithionite and a finely-divided nonadsorbent siliceous substance having an average particle size from 1 to 45 microns, and filtering the resultant mixture and extracting the residue thus obtained at a temperature of between about 60° and 90° C. with a solvent for said precursor, the quantity of solvent utilized corresponding to approximately 1/20 of the volume of said dilute solution.

16. A method for obtaining highly concentrated solutions of riboflavin from dilute solutions thereof, which comprises precipitating the riboflavin in the form of a riboflavin precursor by adding to said solution titanium trichloride and a finely-divided nonadsorbent siliceous substance having an average particle size from 1 to 45 microns, and filtering the resultant mixture and extracting the residue thus obtained at a temperature of between about 60 and 90° C. with a solvent for said precursor, the quantity of solvent utilized corresponding to approximately 1/20 of the volume of said dilute solution.

17. In a process for the recovery of riboflavin from solutions having a riboflavin concentration of at least 20 μg. per ml., the steps comprising adding to the solution a finely-divided nonadsorbent siliceous substance and a soluble reducing agent having an $E°$ which is less negative than about $-0.15$ volt to produce a total potential in said solution of between about $-0.300$ and $-0.650$ volt.

18. In a process for the recovery of riboflavin from solutions having a riboflavin concentration of at least 20 μg. per ml., the steps which comprise adjusting the initial pH of the solution to a value ranging from about 2.0 to 7.5, adding to the solution at a temperature of about 4° to 45° C., a finely-divided nonadsorbent siliceous substance having an average particle size of from 1 to 45 microns and a soluble reducing agent having an $E°$ which is less negative than about $-0.15$ volt, producing a total potential in said solution corresponding to a value of between about $-0.300$ and $-0.650$ volt, and precipitating said riboflavin in the form of a precursor.

19. In a process for the recovery of riboflavin from solutions having a riboflavin concentration of at least 20 μg. per ml., the steps which comprise adjusting the initial pH of the solution to a value ranging from about 5.0 to 5.5, adding to the solution at a temperature of about 20° to 30° C., a finely-divided nonadsorbent siliceous substance having an average particle size of from 1 to 45 microns and a soluble reducing agent having an $E°$ which is less negative than about $-0.15$ volt, producing a measured potential in said solution corresponding to a value of between about $-0.300$ and $-0.650$ volt, and precipitating said riboflavin in the form of a precursor.

GRAHAM W. McMILLAN.